(12) United States Patent
Burnsed et al.

(10) Patent No.: US 12,556,678 B2
(45) Date of Patent: Feb. 17, 2026

(54) TECHNIQUES FOR MULTI-CHANNEL NIGHT VISION SYSTEM ALIGNMENT

(71) Applicant: L3Harris Technologies, Inc., Melbourne, FL (US)

(72) Inventors: Jon D. Burnsed, Tempe, AZ (US); Jacob J. Becker, Gilbert, AZ (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 707 days.

(21) Appl. No.: 17/523,268

(22) Filed: Nov. 10, 2021

(65) Prior Publication Data
US 2023/0142824 A1  May 11, 2023

(51) Int. Cl.
| | |
|---|---|
| *H04N 13/344* | (2018.01) |
| *G02B 7/10* | (2021.01) |
| *G02B 23/12* | (2006.01) |
| *G02B 23/18* | (2006.01) |
| *H04N 13/327* | (2018.01) |

(52) U.S. Cl.
CPC ............ *H04N 13/344* (2018.05); *G02B 7/10* (2013.01); *G02B 23/12* (2013.01); *G02B 23/18* (2013.01); *H04N 13/327* (2018.05)

(58) Field of Classification Search
None
See application file for complete search history.

(56) References Cited

U.S. PATENT DOCUMENTS

| | | |
|---|---|---|
| 9,097,891 B2 | 8/2015 | Border et al. |
| 2002/0122258 A1 | 9/2002 | Moody |
| 2005/0128576 A1* | 6/2005 | Perger ............... G01C 3/04 |
| | | 359/407 |

(Continued)

FOREIGN PATENT DOCUMENTS

| | | |
|---|---|---|
| EP | 1783529 A1 | 5/2007 |
| WO | 2004/002143 | 12/2003 |
| WO | 2007/049213 | 5/2007 |

OTHER PUBLICATIONS

European Search Report received for EP Patent Application No. 22206502.1, mailed on Mar. 24, 2023, 7 pages.

(Continued)

*Primary Examiner* — William R Alexander
*Assistant Examiner* — Mackenzi Waddell
(74) *Attorney, Agent, or Firm* — NIXON & VANDERHYE P.C.

(57) ABSTRACT

One example illustrated herein includes an optical device including a bridge assembly configured to connect two or more monocular tube assemblies and at least two monocular tube assemblies. Each monocular tube assembly includes a housing, an alignment member attached to the housing, the alignment member providing an indication of an optical axis of the monocular tube assembly, and an interface component that links the housing to the bridge assembly, the interface component comprising an adjustment mechanism that enables adjustment of the monocular tube assembly relative to the bridge assembly, such that the adjustment mechanism can be used in conjunction with the alignment member to align different optical axes. Aspects of the present disclosure may be implemented to allow for field-alignment of the optical device.

9 Claims, 6 Drawing Sheets

(56) References Cited

U.S. PATENT DOCUMENTS

| | | | |
|---|---|---|---|
| 2007/0103796 A1* | 5/2007 | Floyd | G02B 23/12 |
| | | | 359/811 |
| 2008/0007826 A1 | 1/2008 | Smith et al. | |
| 2008/0204702 A1* | 8/2008 | Gerth | G01C 3/04 |
| | | | 356/5.01 |
| 2010/0079859 A1* | 4/2010 | Woker | G02B 7/002 |
| | | | 359/411 |
| 2012/0069431 A1 | 3/2012 | Hagen et al. | |
| 2012/0098972 A1* | 4/2012 | Hansen | H04N 5/272 |
| | | | 348/E5.09 |
| 2013/0342474 A1 | 12/2013 | Sultenfuss et al. | |
| 2018/0024376 A1* | 1/2018 | Dohr | G02B 23/145 |
| | | | 345/7 |
| 2019/0316883 A1* | 10/2019 | Poplawski | F41H 13/0056 |
| 2021/0400944 A1 | 12/2021 | Burnsed et al. | |

OTHER PUBLICATIONS

U.S. Appl. No. 16/868,306 dated May 6, 2020.
Office Action received for European Patent Application No. 22206502. 1, mailed on Sep. 11, 2024, 4 pages.

* cited by examiner

TECHNIQUES FOR MULTI-CHANNEL NIGHT VISION SYSTEM ALIGNMENT

BACKGROUND

Binocular systems include two "sides" one for each eye. Typically, the systems are aligned optically such that the scene viewed in each eye is matched to prevent "seeing double" or other image distortion problems. One type of binocular system is a night vision system. Night vision systems allow a user to see in low-light environments without external human visible illumination. This allows for covert vision in a low-light environment to prevent flooding the environment with human visible light or protects the user from being detected due to causing human visible light or light that is otherwise detectable to other night vision systems to be emitted.

Some night vision systems function by receiving low levels of light reflected off of, or emitted from, objects and providing that light to an image intensifier, or $I^2$. The image intensifier has a photocathode. When photons strike the photocathode, electrons are emitted into a vacuum tube and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, for example through an inverting fiber-optic, to an eyepiece where the user can directly view the illuminated phosphor screen, thus allowing the user to see the objects.

Often, night vision system will be implemented in a modular fashion where two or more different night vision scopes can be combined in a single system with different scopes being used for different eyes. Further, some such systems may have the ability to completely remove one of the scopes and use it for as a rifle scope, or for other functionality. This modularity creates problems related to alignment, as users in the field do not have specialized tools typically required to align the different scopes to prevent distortion. Rather, this alignment is typically performed at the factory using specialty tooling and fixturing. Thus, it would be useful to implement modular binocular systems that could be field collimated to align optical axes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One example illustrated herein includes an optical device including a bridge assembly configured to connect two or more monocular tube assemblies and at least two monocular tube assemblies. Each monocular tube assembly includes a housing, an alignment member attached to the housing, the alignment member providing an indication of an optical axis of the monocular tube assembly, and an interface component that links the housing to the bridge assembly, the interface component comprising an adjustment mechanism that enables adjustment of the monocular tube assembly relative to the bridge assembly, such that the adjustment mechanism can be used in conjunction with the alignment member to align different optical axes.

Another example illustrated herein includes a method of manufacturing an optical device. The method may include obtaining a bridge assembly configured to connect two or more monocular tube assemblies and connecting at least two monocular tube assemblies, each of the at least two monocular tube assemblies. Each monocular tube assembly may include an alignment member attached to the housing, the alignment member providing an indication of an optical axis of the monocular tube assembly. Each monocular tube assembly may also include an interface component that links the housing to the bridge assembly, the interface tube assembly relative to the bridge assembly, such that the adjustment mechanism can be used in conjunction with the alignment member to align different optical axes.

Another example illustrated herein includes a method for aligning at least a first monocular tube assembly and a second monocular tube assembly of an optical device. The method may include aligning the first monocular tube assembly to an object located a distance from the optical device based at least in part on a first alignment member associated with the first monocular tube assembly. The method may also include aligning the second monocular tube assembly to the first monocular tube assembly based at least in part on a second alignment member associated with the second monocular tube assembly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Aspects of the present disclosure are generally directed to techniques for multi-channel night vision (or other binocular) system alignment. Some night vision systems may include multiple monocular tube assemblies. For example, a bridge assembly or interface may connect two or more monocular tube assemblies (e.g., intensifier tube assemblies) to provide binocular or panoramic viewing capability. In such examples, each monocular tube assembly may be associated with an independent optical axis. If optical axes of each included monocular tube assembly are not collimated, then the optical device may exhibit a decreased usability, including a decreased or misaligned field of view. Collimation may be performed at a time of manufacture. However, in some cases, collimation may require specialized equipment which may make adjustment or assembly difficult for an end-user to perform outside of a manufacturing facility (e.g., in the field).

In accordance with various aspects of the present disclosure, an optical device (e.g., a night vision system) may include a bridge assembly configured to connect two or more monocular tube assemblies (e.g., intensifier tubes). Each monocular tube assembly may include a housing, an alignment member attached to the housing, and an interface component that links the housing to the bridge assembly. The alignment member may provide an indication of an optical axis of the monocular tube assembly. For example, the alignment may be a laser which is factory-aligned to the housing and to an optical axis of the monocular tube assembly. Similarly, the alignment member may include a post and groove sight aligned with the optical axis of the monocular tube assembly. The alignment member may enable a user of the optical device to align the optical axes of the two or more monocular tube assemblies (e.g., collimate the optical device) outside of a manufacturing facility.

In some examples, the monocular tube assembly may include a display (e.g., a transparent display) that provides visual output to a user of the optical device. In some implementations, the display may output a reticle to a user, which may be an example of an alignment member. For example, each monocular tube assembly may include a display which outputs a reticle to a user, such that the user may align the reticles to align the optical axes of the two or more monocular tube assemblies.

In some examples, a method for aligning the two or more monocular tube assemblies may include aligning a first monocular tube assembly to an object located a distance from the optical device. For example, a user may align the first monocular tube assembly to an object (e.g., a light, a star, a moon, a building, a wall, etc.) using an alignment member (e.g., a laser, a post and groove sight, a reticle, etc.) attached to or otherwise associated with the first monocular tube assembly. In some implementations, the object may be located a distance from the optical device such that the distance satisfies a distance threshold for device collimation (e.g., the object must be far enough away from the device to provide accurate alignment). In some examples, the user may align a second monocular tube assembly to the first monocular tube assembly using an alignment member attached to or otherwise associated with the second monocular tube assembly. In some examples, the method may include outputting a first laser aimed at the object from at least the first monocular tube assembly. Accordingly, the optical device may detect a second laser which is a reflection of the first laser off of the object such that aligning the second monocular tube assembly is based on detecting the second laser. It is noted that a user may use additional various methods to align the two or more monocular tube assemblies of the optical device using the alignment members associated with each monocular tube assembly.

Various aspects of the present disclosure may be implemented to realize one or more potential advantages. For example, techniques for multi-channel night vision system alignment using alignment members associated with each of two or more monocular tube assemblies of an optical device may allow for user adjustment or alignment outside of a manufacturing facility (e.g., in training scenarios, combat scenarios, general in-field use, etc.) without use of specialized equipment or training. As such, usability or versatility of the optical device may be improved.

Aspects of the present disclosure are described herein with respect to optical devices, alignment schemes, and method flows. It is noted that, although the method acts may be discussed in a certain order or illustrated in a flow chart as occurring in a particular order, no particular ordering is required unless specifically stated, or required because an act is dependent on another act being completed prior to the act being performed.

Figure 1:
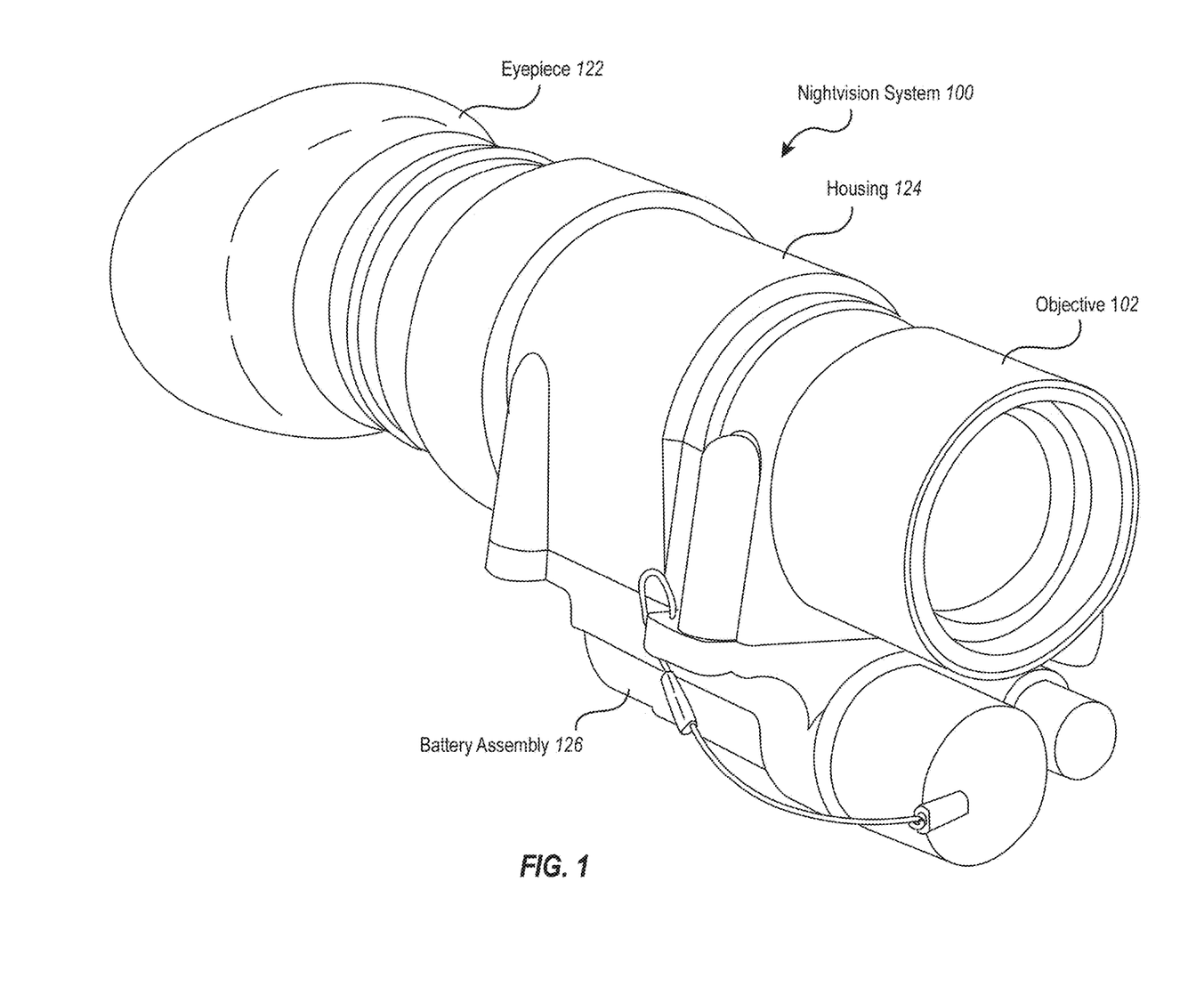
FIG. 1 illustrates a night vision system.

FIG. 1 illustrates a PVS-14 night vision system 100. In the example of FIG. 1, the night vision system 100 include a housing 124. In some examples, the housing 124 houses an image intensifier, a transparent display, and various other components. The night vision system 100 further includes an objective 102 which receives weak light reflected or generated in an environment. The objective 102 includes optics such as lenses, waveguides, or other optical components for receiving and transmitting light to an image intensifier, discussed in more detail below. The night vision system 100 further includes an eyepiece 122. In some examples, the eyepiece 122 includes optics for focusing images created by the night vision system 100, including images created by an image intensifier and images created by a transparent display, into the eye of a user. In some examples, as described with reference to FIG. 2, modern ancillary functionality can be added to existing night vision systems.

Figure 2:
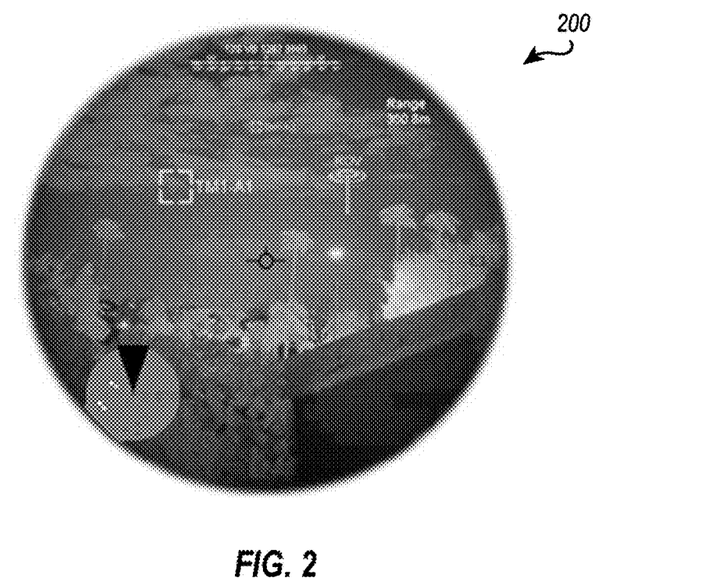
FIG. 2 illustrates a night vision scene image with heads-up display functionality.

FIG. 2 illustrates an image 200 including a heads-up display displayed on a night vision image output from an intensifier tube. In some examples, systems may implement a heads-up display by adding image overlay capabilities with a night vision system, in which the image overlay capabilities are added by using a transparent display.

The heads-up display may display to a user, in or around the field of view of an environment, various pieces of information to create an augmented reality (AR) environment. Such information may include, for example, a navigational heading, the speed at which the user is moving, coordinates, communication messages (e.g., email, short message service (SMS), etc.), time of day or other timing information, vital signs for the user such as heart rate or respiration rate, indicators indicating whether an object being viewed by the night vision system is friendly or adversarial, battery charge level for the night vision system or other devices, weather conditions, contact information, audio information (e.g., volume, playlist information, artist, etc.), etc.

In some implementations, the heads-up display can superimpose thermal image data over intensified light images. In particular, a night vision system 100 may include, or have access to data from, thermal cameras for detecting thermal characteristics in an environment. Data from thermal cameras can be used to control the transparent display 318 to display thermal imaging data, correlated with artifacts in intensified light images, to the user. For example, various colors can be used to represent various temperatures where the colors are output by the transparent display 318 to the user. The colors are overlaid on intensified light image artifacts to indicate temperature of objects in an environment. The transparent display 318, or other elements, may include photodetectors for detecting intensified light to determine the locations of various objects in a field of view or for correlating thermal colors, target indicators, or other images output by the transparent display 318. Due to psychovisual perception in humans, there is no need to fully colorize an intensified light image. Rather, some examples may use color oversaturated grid lines, horizontal lines, diagonal lines, dots, or event test to create a perception of colorization for monochrome image intensifier images. An example of this technology is referred to as a color assimilation grid. In some examples, additional textual information may be provided (e.g., by using colored text) if the user focuses their attention on a text, but the text may serve to colorize an image if the user focuses on the image as a whole (e.g., due to the psychovisual perception phenomenon).

Figure 3:
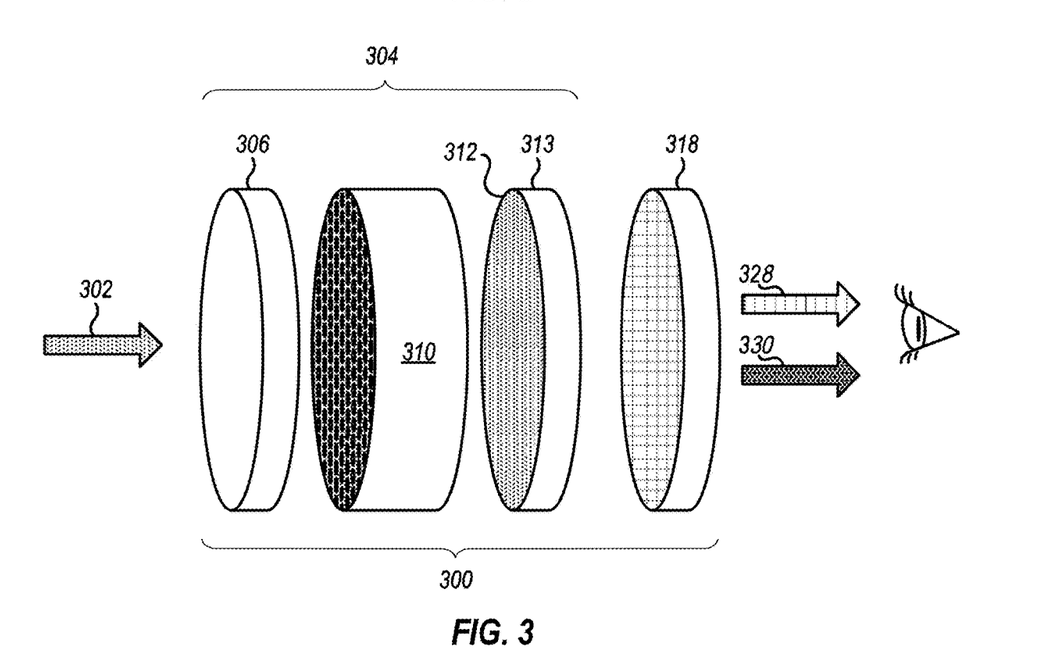
FIG. 3 illustrates a block diagram of a night vision system.

FIG. 3 illustrates a block diagram of a night vision system 300. Night vision systems may include an objective (e.g., objective 102 as described with reference to FIG. 1) to focus input light 302 into an image intensifier 304. Such input light may be, for example, from ambient sources, such as light from heavenly bodies such as stars, the moon, or even faint light from the setting sun. Additionally, or alternatively, ambient sources may include light from buildings, automobiles, or other faint sources of light which cause reflection of light into the objective from an object being viewed in a night vision environment. A second source of light may be light emitted from an external source towards an object, reflected off of the object, and into the objective. For example, the source may be an infrared source that is not detectable in a visual spectrum for human observers. A third source of light may be light emitted by an object itself. For example, an object may emit infrared heat energy directed into the objective. Nonetheless, the night vision system may be able to convert the light emitted from a source into a viewable image for a user.

The objective may direct any input light 302 into the image intensifier 304. In some examples, the image intensifier 304 may include functionality for amplifying light received from the objective to create a sufficiently strong image that can be viewed by a user. Amplifying light may be accomplished using various technologies such as, for example, a photocathode 306, a microchannel plate 310, and a phosphor screen 312. The photocathode 306 may be configured to generate photo electrons in response to incoming photons. Electrons emitted from the photocathode 306 may be directed into the microchannel plate 310. The microchannel plate 310 may multiply electrons directed therein.

Electrons emitted from the microchannel plate 310 may be directed to a phosphor screen 312 which glows as a result of electrons striking the phosphor screen 312, which may create a monochrome image from the input light 302.

A fiber-optic 313 may carry the monochrome image as intensified light to an eyepiece (e.g., the eyepiece 122 as described with reference to FIG. 1) of a night vision system. The intensified light 328 may be output to a user. The fiber-optic 313 may be twisted 180 degrees to undo inversion caused by the objective to allow for convenient direct viewing of the screen.

FIG. 3 further illustrates the transparent display 318. The transparent display 318 may allow intensified light to pass through the transparent display 318, but also generates its own light, from LEDs or other light emitters, to transmit to a user. Creating a transparent display may be accomplished, for example, using the disclosure of U.S. patent application Ser. No. 16/868,306, filed on May 6, 2020, titled "Backside Etch Process For Transparent Silicon Oxide Technology", which is incorporated herein by reference, in its entirety.

The transparent display 318 may be implemented behind the fiber-optic 313 (e.g., closer to the eyepiece (e.g., the eyepiece 122 as described with reference to FIG. 1) than the fiber-optic 313), but in other examples may be implemented in front of the fiber-optic 313. The use of a fiber-optic 313 within night vision systems inverts and translates the focal plane allowing the transparent display overlay to be presented on either side without impacting the ability of the eyepiece 122 to focus on an image. However, certain manufacturing or mechanical constraints may incentivize placement of the transparent display 318 behind the fiber-optic 313 including the difficulty of inserting electronics within a vacuum package. Placing the transparent display 318 external to the fiber-optic 313 may be done to allow the transparent display 318 to be applied after the image intensifier tube has been manufactured and sealed, lowering production complexity. As discussed herein, the transparent display 318 may include functionality for displaying information to a user. Such information may include graphical content, including text, images, and the like. In some examples, the transparent display 318 may display in shaded monochrome. Additionally, or alternatively, the transparent display 318 may display in multiple colors. Additionally, or alternatively, the transparent display 318 may display in 1-bit monochrome.

In the example illustrated in FIG. 3, the transparent display 318 outputs display light 330 which may be sent to the eyepiece (e.g., the eyepiece 122 as described with reference to FIG. 1). As noted previously, intensified light is also provided to the eyepiece. Thus, an image such as that illustrated in FIG. 2 is presented to a user in the night vision system.

As noted previously, the transparent display 318 may be composed of a number of active elements. Different active elements cause certain optical performance capabilities. Such capabilities may be one or more of abilities to output color output, output monochrome output, detect light, have a certain pixel density, have a certain pitch, etc. In particular the transparent display 318 may be a digital display having a certain pixel density. Each pixel may be implemented on a single active island, although in some examples, an island may have multiple pixels, or even only a single sub-pixel element. Each pixel may have one or more transistors controlling one or more OLED emitters (or other light emitting devices). In some examples, pixels may additionally or alternatively include light detectors. This can be useful for detecting the intensified light from the phosphor screen 312. This detected light may be used to characterize an image intensifier image. For example, the detected light may be used for recording scene events. Additionally, or alternatively, the detected light may be used for improving placement of elements displayed on the heads-up display shown in FIG. 2. For example, edge detection techniques may be used using the detected light, and images generated and displayed by the display 318 may be keyed off of detected edges. Of particular note herein is that the transparent display may be used to detect light for monocular tube assemblies of an optical device.

Thus, some examples may implement a transparent detector. Additionally, or alternatively, some examples may implement a transparent display that include detector functionality. That is, both light emitters and light detectors may be implemented in an active area of the transparent display 318. Accordingly, the transparent display 318 may be representative of a stacked device formed in a single semiconductor chip that overlaps an underlying device (e.g., an image intensifier 304). The stacked device may be transparent to light in a first spectrum (e.g., according to a predefined transmission efficiency), which may be the visible spectrum of light output by the phosphor screen 312. That is, the transparent display 318 may not be fully transparent due to the blocking of the active devices, but transparency as described herein refers to at least partial transparency according to some transmission efficiency. It is noted that overlapping as used herein means that elements are in a same optical path. This can be accomplished by having elements in coaxial alignment when the optical path is straight. Additionally, or alternatively, this can be accomplished by using various waveguides or other elements to align optical paths thus not requiring physical coaxial alignment.

If some examples implement a photodetector, the photodetector may absorb a portion of intensified light, converting the intensified light to an electrical signal. For example, the photodetector may be a two-dimensional array of light detectors, such as photodiodes, which generates a charge current or any other form of digital data level proportional to an intensity of the intensified light, as a function of position. Accordingly, the photodetector may generate a two-dimensional array of electrical charge that represents the intensified image. In some examples, the two-dimensional array of electrical charge may be periodically read from the photodetector (e.g., the detected can be read from the photodetector like in a charged coupled device (CCD) camera). In some examples, the two-dimensional array of electrical signals from the photodetector is processed or used locally, e.g., within the transparent display 318 device, at the readout or pixel levels, to modulate in real-time the amplitude of the display light 330.

Transparent regions shown in preceding figures may be created in a number of ways. In some examples, the transparent regions may be created using processes described in U.S. patent application Ser. No. 16/686,306 titled "Backside Etch Process For Transparent Silicon Oxide Technology", which is incorporated herein by reference in its entirety. Briefly, the reference application describes a process for creating transparent regions in otherwise opaque portions of semiconductor materials.

As illustrated in FIG. 3, intensified light may be transmitted through the transparent display 318 to the eyepiece of the night vision system, and then to a user. However, the intensified light may be transmitted to the user through the transparent display 318, meaning that the intensified light may be affected by characteristics of the transparent display 318

Figure 4:
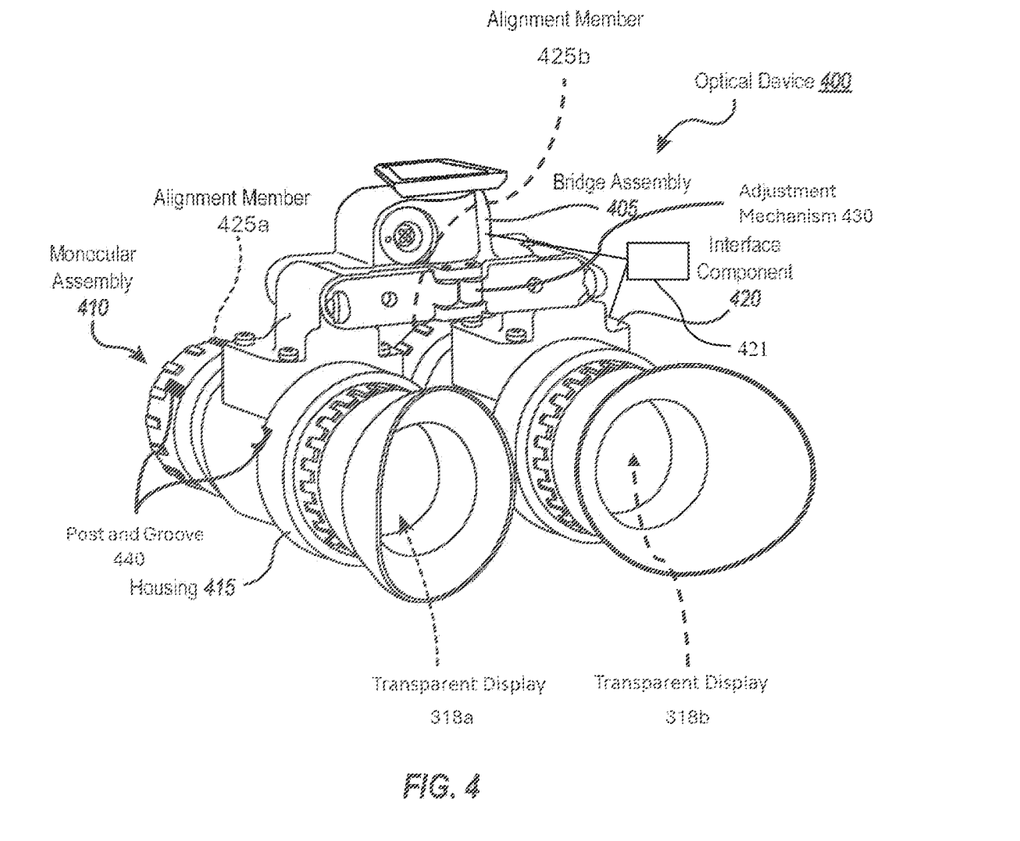
FIG. 4 illustrates an optical device that supports techniques for multi-channel night vision system alignment in accordance with aspects of the present disclosure.

FIG. 4 illustrates an example of an optical device 400 that supports techniques for multi-channel night vision system alignment, in accordance with one or more aspects of the present disclosure. In some examples, the optical device 400 may be implemented by or in association with a night vision system and/or a heads-up display as described with reference to FIGS. 1-3.

The optical device 400 may include a bridge assembly 405 which is configured to connect at least two monocular assemblies 410 (e.g., intensifier tubes). Each monocular assembly 410 may include a housing 415 and an interface component 420 which links the monocular assembly 410 to the housing bridge assembly 405. The interface component 420, the bridge assembly 405, or both may include an adjustment mechanism which enables adjustment of an alignment or orientation of the monocular assembly 410. In some implementations, the adjustment mechanism may enable manual adjustment or may include components (e.g., motors) which enable automated adjustment. Similarly, the interface component 420, the bridge assembly 405, or both may include a locking mechanism 421 configured to disable adjustment of, or otherwise lock an orientation of, the monocular assembly 410. In some implementations, the bridge assembly 405 may include a mount (e.g., a hot-shoe mount) for attaching the optical device 400 to an article of clothing or other equipment (e.g., a helmet).

Each monocular assembly 410 may also include an alignment member 425425a or 425b which provides an indication of an optical axis of the monocular assembly 410. In some examples, the alignment member 425425a or 425b may include a laser (e.g., attached to or otherwise fixed to the housing 415) which is factory-aligned to an optical axis of the monocular assembly 410. In such examples, the laser may be usable for aligning the at least two monocular assemblies 410. For example, a user may align a first monocular assembly 410 to an object using the laser associated with the first monocular assembly 410 and then may align the second monocular assembly 410 to the object using the laser associated with the second monocular assembly 410. In some implementations, the laser may be mounted to the monocular assembly 410 using a dovetail or similar mount and may be powered with a local battery or via a hot-shoe mount attached to the bridge assembly 405. In some implementations, a groove may be molded into the housing 415 of a monocular assembly 410 such that the groove may be used to ensure the laser is aligned to the optical axis of the monocular assembly 410.

In some examples, the alignment member 425a or 425b may include a transparent display 318a or 318b (e.g., a transparent display 318, as described with reference to FIG. 3, which may be a transparent organic light-emitting device (TOLED)) which is configured to provide a display to a user of the optical device 400. For example, the transparent display 3318a or 318b may output a reticle (e.g., a crosshair, concentric circles, an arc with a center dot, etc.) to the user for aiming or otherwise aligning the optical device 400 or the associated monocular assemblies 410. In such examples, the transparent display 318a or 318b may be used to align the at least two monocular assemblies 410. For example, a user may align the at least two monocular assemblies 410 by aligning reticles displayed in each of the monocular assemblies 410 by the transparent display 318a or 318b of each monocular assembly 410. Similarly, a user may align the reticles with an object located some distance from the optical device 400 to align the monocular assemblies 410. In some implementations, the transparent display 318a or 318b may include a transparent detector (e.g., a photodiode) which is configured to detect a light source such that the transparent display 318a or 318b may, in some examples, provide an indication of the light source to the user. The indication of the light source in each connected monocular assembly can be aligned as appropriate by the user to align the monocular assemblies.

In some examples, the alignment member 425425a or 425b may include a post and groove sight 440 attached to the housing 415. In such examples, a user may manually align sights associated with each monocular assembly 410 to align the optical axes of each monocular assembly 410. It is noted that, although illustrated with respect to a helmet-mounted optical system, aspects of the present disclosure may be applied to other night vision systems (e.g., weapon-mounted systems). Implementing aspects of the optical device 400 may lead to an increased modularity or usability of a night vision or optical system.

Figure 5:
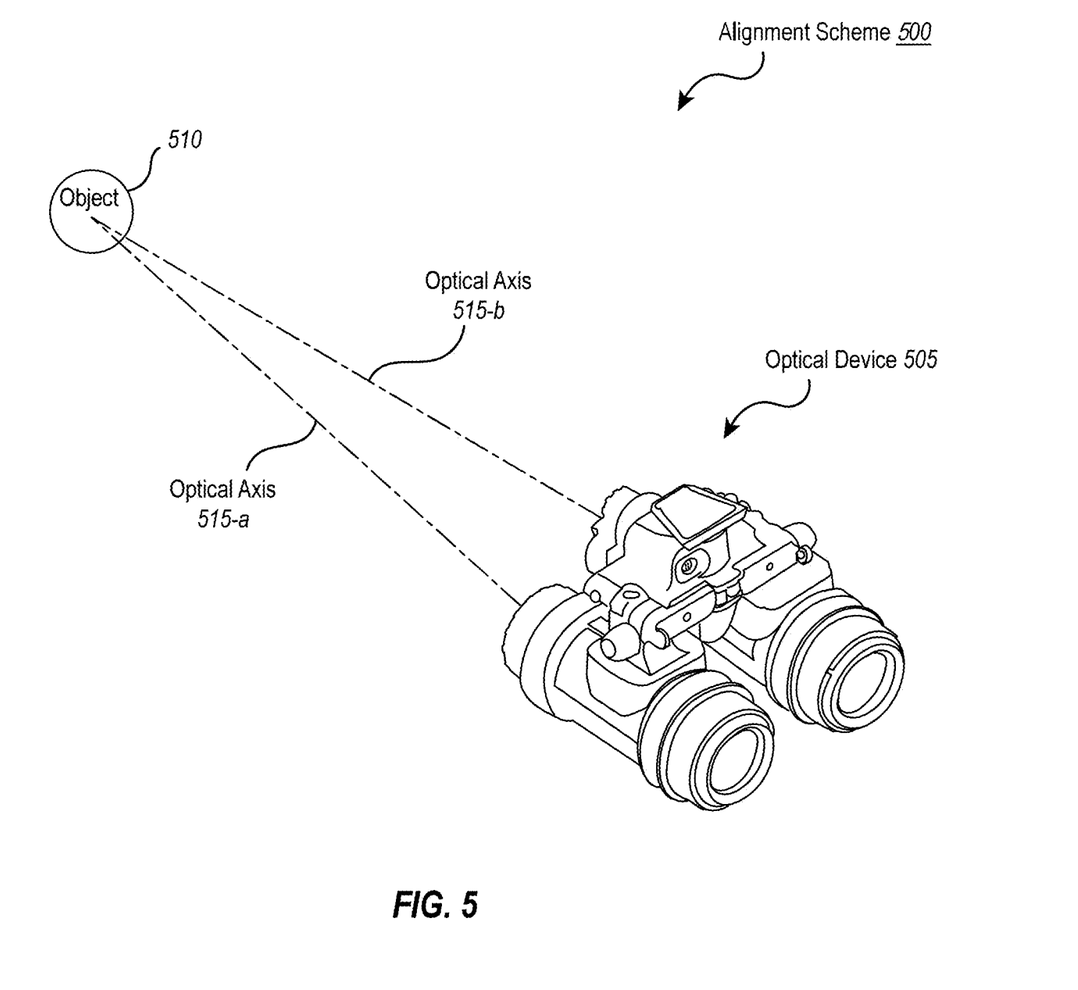
FIG. 5 illustrates an alignment scheme that supports techniques for multi-channel night vision system alignment in accordance with aspects of the present disclosure.

FIG. 5 illustrates an example of an alignment scheme 500 that supports techniques for multi-channel night vision system alignment, in accordance with one or more aspects of the present disclosure. In some examples, the alignment scheme 500 may be implemented by or in association with a night vision system, a head-up display, or an optical device as described with reference to FIGS. 1-4. The alignment scheme 500 may include an optical device 505 having at least an optical axis 515-a and an optical axis 515-b associated with first and second monocular tube assemblies, respectively. The alignment scheme 500 may also include an object 510 (e.g., a light source, a building, a car, etc.) located a distance from the optical device 505 (e.g., that satisfies a distance threshold such that an alignment or collimation method may provide sufficiently accurate results).

In some examples, a method for collimating the optical device 505 (e.g., for aligning all optical components of the optical device 505) may include aligning the optical axis 515-a of a first monocular tube assembly of the optical device 505 to the object 510 (e.g., using an alignment member 425a or 425b, as described with reference to FIG. 4). For example, the method may include outputting a laser from the first monocular tube assembly aimed at the object 510. The second monocular tube assembly may detect a reflection of the first laser off of the object 510 as a second laser. In some embodiments, a detector array included as part of the transparent display 318a or 318b may be used to detect the reflection and the transparent display may direct the user as to adjustments that can be made to align the monocular tube assemblies. Accordingly, a user may use the detected second laser to align the optical axis 515-b to the optical axis 515-a. Similarly, a user may use reticles associated with each monocular tube assembly (such as by displaying the reticles using the transparent display 318a or 318b for each monocular tube assembly) to align the optical axis 515-b to the optical axis 515-a (e.g., by aligning the reticles such that they are coaxial or overlap). It is noted that, although described with reference to user-adjustment, aspects of the present disclosure may include an automated process performed by an optical device. Implementing aspects of the alignment scheme 500 may lead to an increased modularity or usability of a night vision or optical system.

Figure 6:
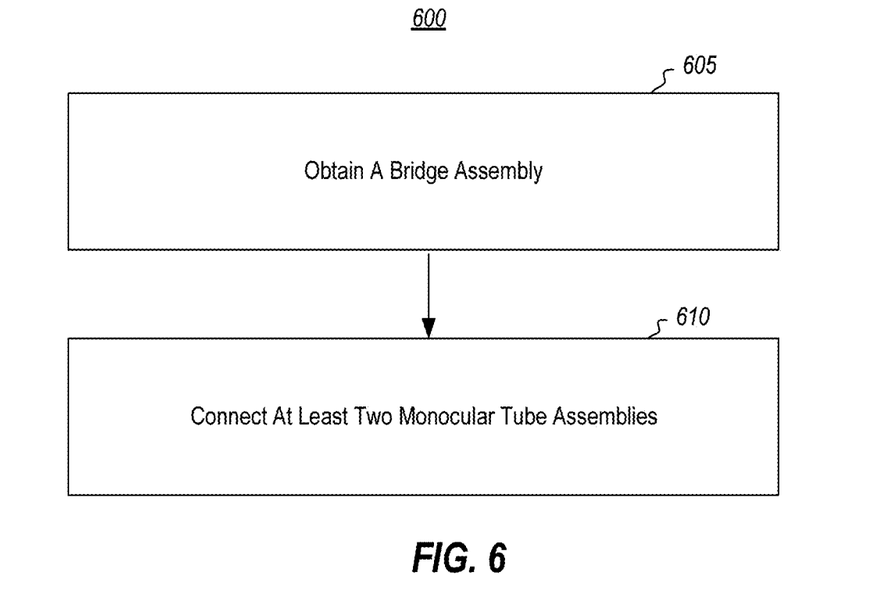
FIGS. 6-8 illustrate method flows that support techniques for multi-channel night vision system alignment in accordance with aspects of the present disclosure.

FIG. 6 illustrates an example of a method flow 600 that supports techniques for multi-channel night vision system alignment, in accordance with one or more aspects of the present disclosure. In some examples, the method flow 600 may be implemented by or in association with a night vision system, a heads-up display, or an optical device as described with reference to FIGS. 1-5. It is noted that steps of the method flow 600 may be performed in a different order than illustrated or steps may be added or removed.

At 605, the method flow 600 may include obtaining a bridge assembly configured to connect two or more monocular tube assemblies.

At 610, the method flow 600 may include connecting at least two monocular tube assemblies. Each of the at least two monocular tube assemblies includes a housing, an alignment member attached to the housing, the alignment member providing an indication of an optical axis of the monocular tube assembly, and an interface component that links the housing to the bridge assembly, the interface component including an adjustment mechanism that enables adjustment of the monocular tube assembly relative to the bridge assembly, such that the adjust mechanism can be used in conjunction with the alignment member to align different optical axes.

In some examples, the alignment member includes a laser. In some examples, the alignment member of at least one monocular tube assembly of the at least two monocular tube assemblies includes a display configured to display a reticle in a location corresponding to the optical axis of the at least one monocular tube assembly. In some implementations, each of the at least two monocular tube assemblies is configured to provide optical output to a user and the display includes a transparent display configured to transmit at least a portion of the optical output through the transparent display to the user. In some examples, each of the at least two monocular tube assemblies is configured to provide optical output to a user and the alignment member of at least one monocular tube assembly of the at least two monocular tube assemblies comprises a transparent detector configured to detect reflected output from an object and to transmit at least a portion of the optical output through the transparent detector to the user.

In some examples, the method flow 600 may include attaching a collimation mechanism configured to automatically align the at least two monocular tube assemblies such that the optical axes of the at least two monocular tube assemblies are aligned to a common point. In some implementations, the alignment member includes a post a groove sight. Implementing various aspects of the method flow 600 may lead to an optical device having an increase usability or versatility.

Figure 7:
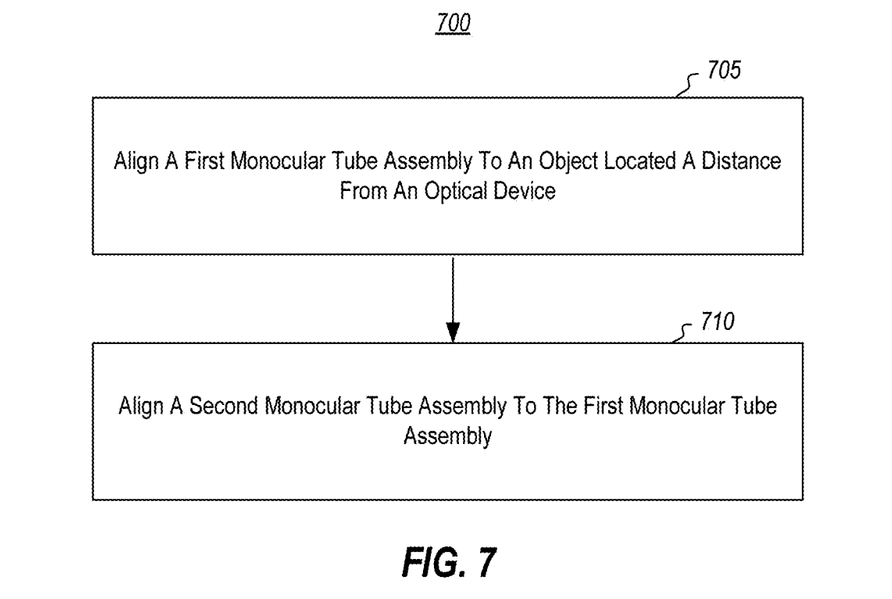

FIG. 7 illustrates an example of a method flow 700 that supports techniques for multi-channel night vision system alignment, in accordance with one or more aspects of the present disclosure. In some examples, the method flow 700 may be implemented by or in associated with a night vision system, a heads-up display, or an optical device as described with reference to FIGS. 1-5 or may include steps or methods described with reference to FIG. 6. For example, the method flow 700 may be implemented in association with an optical device having at least a first monocular tube assembly and a second monocular tube assembly. It is noted that steps of the method flow 700 may be performed in a different order than illustrated or steps may be added or removed.

At 705, the method flow 700 may include aligning the first monocular tube assembly to an object located a distance from the optical device based at least in part on a first alignment member associated with the first monocular tube assembly.

At 710, the method flow 700 may include aligning the second monocular tube assembly to the first monocular tube assembly based at least in part on a second alignment member associated with the second monocular tube assembly.

In some examples, the first alignment member includes a first reticle, and the second alignment member includes a second reticle, in which aligning the second monocular tube assembly to the first monocular tube assembly includes aligning the second reticle to the first reticle. In some examples, the object include a light, in which aligning the first monocular tube assembly is based on detecting the light. In some examples, the object is located at a distance satisfying a distance threshold.

Figure 8:
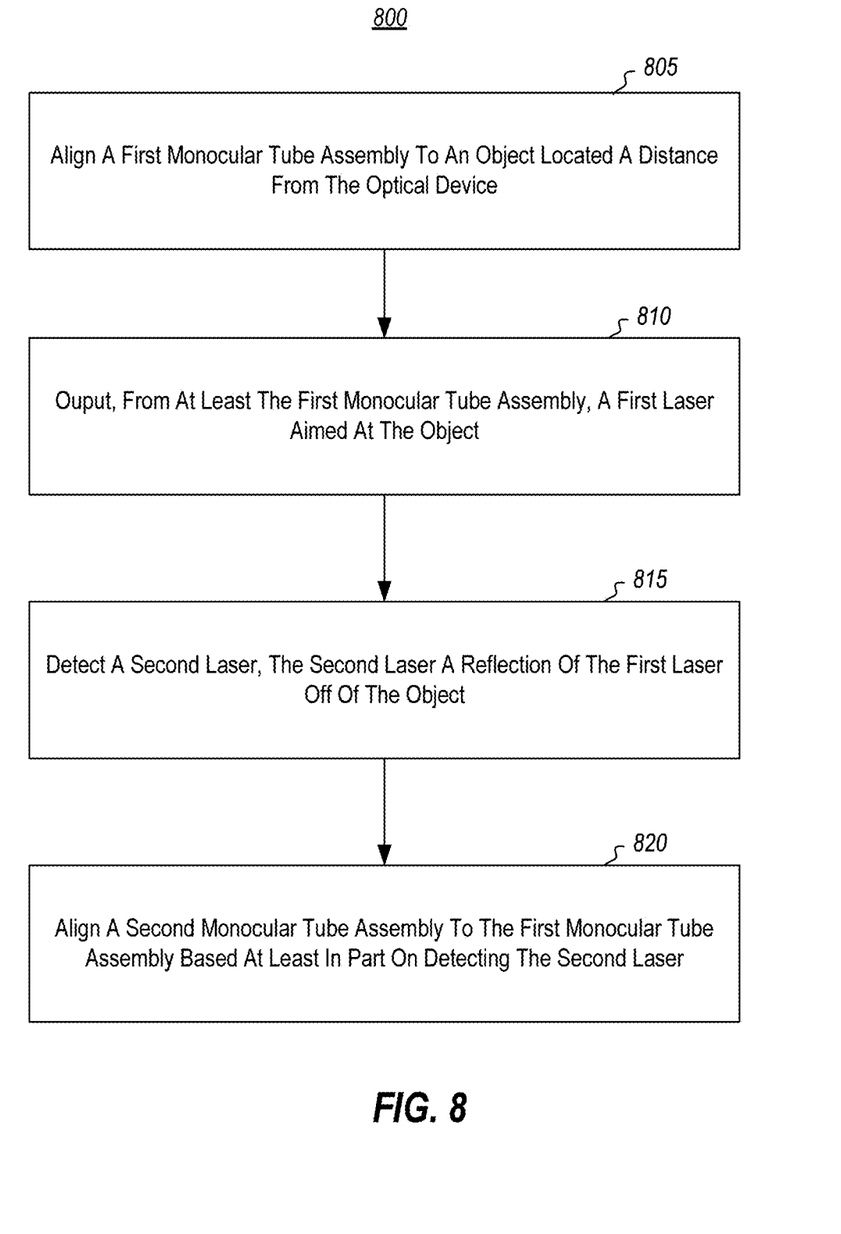

FIG. 8 illustrates an example of a method flow 800 that supports techniques for multi-channel night vision system alignment, in accordance with one or more aspects of the present disclosure. In some examples, the method flow 800 may be implemented by or in associated with a night vision system, a heads-up display, or an optical device as described with reference to FIGS. 1-5 or may include steps or methods described with reference to FIGS. 6 and 7. For example, the method flow 800 may be implemented in associated with an optical device having at least a first monocular tube assembly and a second monocular tube assembly. It is noted that steps of the method flow 800 may be performed in a different order than illustrated or steps may be added or removed.

At 805, the method flow 800 may include aligning the first monocular tube assembly to an object located a distance from the optical device based on a first alignment member associated with the first monocular tube assembly.

At 810, the method flow 800 may include outputting, from at least the first monocular tube assembly, a first laser aimed at the object.

At 815, the method flow 800 may include detecting a second laser, the second laser a reflection of the first laser off of the object.

At 820, the method flow 800 may include aligning the second monocular tube assembly to the first monocular tube assembly based on detecting the second laser. Implementing various aspects of the method flow 800 may lead to an increased usability and versatility of an optical device.

The present invention may include other specific forms without departing from its characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical device, comprising:
    a bridge assembly configured to connect two or more monocular tube assemblies; and
    at least two monocular tube assemblies including a first monocular tube assembly and a second monocular tube assembly, each of the at least two monocular tube assemblies comprising:
    a housing,
    an alignment member attached to the housing, the alignment member providing an indication of an optical axis of the monocular tube assembly and enabling alignment of the optical axis of the monocular tube assembly, and
    an interface component that links the housing to the bridge assembly, the interface component coupled to an adjustment mechanism that enables adjustment of the monocular tube assembly relative to the bridge assembly such that when the optical axis lies in a horizontal plane, adjustment of the monocular tube assembly relative to the bridge assembly takes place in the horizontal plane on a vertical axis, and such that the adjustment mechanism is used in conjunction with the alignment member to align the optical axis of one of the first and second monocular tube assemblies to the optical axis of the other one of the first and second monocular assemblies.

2. The optical device of claim 1, wherein the alignment member comprises a laser.

3. The optical device of claim 1, wherein an alignment member of at least one monocular tube assembly of the at least two monocular tube assemblies comprises a display configured to display a reticle in a location corresponding to the optical axis of the at least one monocular tube assembly.

4. The optical device of claim 3, wherein each of the at least two monocular tube assemblies is configured to provide optical output to a user and wherein the display comprises a transparent display configured to transmit at least a portion of the optical output through the transparent display to the user.

5. An optical device, comprising:
    a bridge assembly configured to connect two or more monocular tube assemblies; and
    a first monocular tube assembly and a second monocular tube assembly, each of the monocular tube assemblies comprising:
    a housing,
    an alignment member attached to the housing, the alignment member providing an indication of an optical axis of the monocular tube assembly and enabling alignment of the optical axis of the monocular tube assembly, and
    an interface component that links the housing to the bridge assembly, the interface component coupled to an adjustment mechanism that enables adjustment of the monocular tube assembly relative to the bridge assembly, such that the adjustment mechanism is used in conjunction with the alignment member to align the optical axis of the first monocular tube assembly to the optical axis of the second monocular tube assembly,
    wherein each of the monocular tube assemblies is configured to provide optical output to a user, wherein the alignment member of the first monocular tube assembly comprises a laser that is aimed in use at an object, and wherein the second monocular tube assembly comprises a transparent detector that is configured to detect a reflection of the laser from the first monocular tube assembly as a second laser reflected from the object and to transmit at least a portion of the optical output through the transparent detector to the user, wherein the laser of the first monocular tube assembly and the detector of the second monocular tube assembly are configured to enable alignment of the optical axis of the second monocular tube assembly with the optical axis of the first monocular tube assembly.

6. The optical device of claim 1, further comprising a collimation mechanism configured to automatically align the at least two monocular tube assemblies such that the optical axes of the at least two monocular tube assembly are aligned to a common point.

7. The optical device of claim 1, wherein the alignment member comprises a post and groove sight aligned with the optical axis of the monocular tube assembly.

8. The optical device of claim 1, wherein the optical device comprises a night vision device.

9. The optical device of claim 1, wherein each of the at least two monocular tube assemblies comprises:
    a locking mechanism configured to disable adjustment of the monocular tube assembly by the adjustment mechanism.

* * * * *